(12) United States Patent
Lee

(10) Patent No.: US 10,239,512 B2
(45) Date of Patent: Mar. 26, 2019

(54) ENGAGEMENT STRUCTURE OF PUSH-ROD GUIDE AND PUSH-ROD GUIDE COVER OF BRAKE CHAMBER FOR VEHICLE

(71) Applicant: MIRAEVC CO., LTD., Jeollabuk-do (KR)

(72) Inventor: Seung Hoon Lee, Jeollabuk-do (KR)

(73) Assignee: MIRAEVC CO., LTD., Jeollabuk-do (KR)

( * ) Notice: Subject to any disclaimer, the term of this patent is extended or adjusted under 35 U.S.C. 154(b) by 0 days.

(21) Appl. No.: 15/612,194

(22) Filed: Jun. 2, 2017

(65) Prior Publication Data
US 2018/0009428 A1 Jan. 11, 2018

(30) Foreign Application Priority Data
Jul. 7, 2016 (KR) .................. 10-2016-0086006

(51) Int. Cl.
| | | |
|---|---|---|
| B60T 17/08 | (2006.01) |
| F16D 65/28 | (2006.01) |
| F16D 121/08 | (2012.01) |
| F16D 121/10 | (2012.01) |
| F16D 125/08 | (2012.01) |
| F16D 125/12 | (2012.01) |
| F16D 125/70 | (2012.01) |

(52) U.S. Cl.
CPC .......... B60T 17/083 (2013.01); B60T 17/088 (2013.01); F16D 65/28 (2013.01); F16D 2121/08 (2013.01); F16D 2121/10 (2013.01); F16D 2125/08 (2013.01); F16D 2125/12 (2013.01); F16D 2125/70 (2013.01)

(58) Field of Classification Search
CPC ...... B60T 17/083; B60T 13/38; B60T 17/088; F16D 65/28; F16D 2121/08; F16D 2121/10; F16D 2125/12; F16D 2125/585; F16D 2125/08; F16D 2125/70
USPC .............................. 188/170, 106 F; 92/48, 63
See application file for complete search history.

(56) References Cited

U.S. PATENT DOCUMENTS

| | | | | |
|---|---|---|---|---|
| 5,671,654 A | * | 9/1997 | Plantan | B60T 17/083 285/179 |
| 6,588,314 B1 | * | 7/2003 | Stojic | B60T 17/083 92/63 |
| 2013/0032437 A1 | * | 2/2013 | Akin | B60T 17/08 188/106 F |

(Continued)

FOREIGN PATENT DOCUMENTS

| | | | | |
|---|---|---|---|---|
| EP | 0554050 A1 | * | 8/1993 | ............ B60T 17/083 |
| KR | 20130011802 A | * | 1/2013 | |
| KR | 10-1567709 | | 11/2015 | |

*Primary Examiner* — Pamela Rodriguez

(57) ABSTRACT

The present disclosure relates to an engagement structure of a push rod guide and a push rod guide cover of a brake chamber for a vehicle, in which a pair of semi-circular, hingedly connected, half members in a shape of a plate are assembled at a side surface of an axial direction of the push rod into a shape of a disk, a push rod opening is formed at the center of the disk to guide a movement of the push rod, a protrusion projecting upwards is provided at a central part of the push rod guide, forming a step in a radial direction of the push rod guide, and a receiving groove corresponding to the step is formed on an inner circumferential surface of the push rod guide cover and is connected to the step.

5 Claims, 3 Drawing Sheets

(56) References Cited

U.S. PATENT DOCUMENTS

2013/0292216 A1\* 11/2013 Bradford ............... B60T 17/083
188/106 F
2017/0050628 A1\* 2/2017 Park ........................ B60T 13/38

\* cited by examiner

ENGAGEMENT STRUCTURE OF PUSH-ROD GUIDE AND PUSH-ROD GUIDE COVER OF BRAKE CHAMBER FOR VEHICLE

CROSS-REFERENCE TO RELATED APPLICATION

This application claims priority of Korean Patent Application No. 10-2016-0086006, filed on Jul. 7, 2016, in the KIPO (Korean Intellectual Property Office), the disclosure of which is incorporated herein entirely by reference.

BACKGROUND OF THE INVENTION

Field of the Invention

The present disclosure relates to an engagement structure of a push rod guide and a push rod guide cover of a brake chamber for a vehicle, and more particularly, to an engagement structure of a push rod guide and a push rod guide cover of a brake chamber for a vehicle, the push rod guide configured to guide a movement of a push rod moving up and down in a bottom housing.

Description of the Related Art

Large vehicles such as buses, trucks, trailers, and other heavy machinery use a pneumatic spring brake chamber for vehicles that performs delicate and fast braking operation while high-speed driving or parking and has good braking performance.

With regard to a vehicle brake chamber, Korean Patent Registration No. 10-1567709 discloses a brake actuator. The vehicle brake chamber includes a head housing, an adaptor housing and a bottom housing of a hollow shape in a sequential order from the top. On the other hand, a piston is placed between the head housing and the adaptor housing, and a hollow actuator rod is connected to the piston and placed through a through-hole of the adaptor housing. A diaphragm is placed between the adaptor housing and the bottom housing. Furthermore, a pressure plate supporting the diaphragm and a push rod supporting the pressure plate are provided, and the push rod is placed through the through-hole formed in the bottom housing.

Through this structure, a space formed between the head housing and the piston is a spring chamber, and a spring is placed therein. A space provided between the piston and the adaptor housing is a pressure chamber. A space formed between the adaptor housing and the diaphragm is a service chamber, and a push rod chamber is formed between the diaphragm and the bottom housing.

As described above, the vehicle brake chamber is composed of the spring chamber, the pressure chamber, the service chamber, and the push rod chamber from top to bottom, and as the pressure plate moves up and down by adjustment of the elastic force of the spring and the air pressure in the service chamber, the push rod connected through the lower end of the bottom housing is moved, allowing the brake to operate while the vehicle is driving or parked.

In this instance, when the push rod moves up and down, a push rod guide which guides the movement of the push rod is placed on the lower surface of the bottom housing. Conventionally, the push rod guide was produced separately, and was connected to the push rod with a connecting member. The assembling of the push rod guide using the fixing member makes it difficult to achieve firm and strong engagement in the bottom housing, and requires additional fixing to assemble the connecting member, causing production process deterioration.

SUMMARY OF THE INVENTION

The present disclosure is directed to providing an engagement structure of a push rod guide and a push rod guide cover of a brake chamber for a vehicle, in which the push rod guide is integrally formed and is engaged at the side surface of a push rod in a simple manner, and the push rod guide is firmly fixed to an lower surface of a bottom housing using the push rod guide cover.

To achieve the object, an engagement structure of a push rod guide and a push rod guide cover of a brake chamber for a vehicle according to an embodiment of the present disclosure includes a head housing, a bottom housing, an adaptor housing provided between the head housing and the bottom housing to connect the head housing to the bottom housing, and a diaphragm fixed between the adaptor housing and the bottom housing to divide a space between the adaptor housing and the bottom housing; a push rod which supports a lower surface of the diaphragm and moves along a push rod through-hole formed on a lower surface of the bottom housing; a yoke connected to an end of the push rod; and a return spring placed between the push rod and the bottom housing, wherein after the push rod and the yoke are inserted into the through-hole, the push rod guide is assembled at a side surface of axial direction of the push rod on an inner side of the bottom housing, and the push rod guide cover is connected to the push rod guide and is supported on the return spring to fix the push rod guide, the push rod guide is composed of a pair of semi-circular half members in a shape of a plate, the pair of half members hingedly connected are assembled at the side surface of axial direction of the push rod into a shape of a disk, and a push rod opening is formed at a center of the disk to guide the movement of the push rod, and a protrusion projecting upwards is provided at a central part of the push rod guide, forming a step in a radial direction of the push rod guide, and a receiving groove corresponding to the step is formed on an inner circumferential surface of the push rod guide cover.

Here, the push rod guide is formed of a plastic material, and the pair of half members are, at one end, integrally formed by injection molding to form a hinge.

The engagement structure of a push rod guide and a push rod guide cover of a brake chamber for a vehicle according to the present disclosure achieves engagement at the side surface of the push rod in a simple manner because a pair of half members pivot around a hinge shaft, and as the push rod guide is inserted fixedly into the receiving groove formed in the push rod guide cover, firm and strong engagement can be maintained without any separate connecting member, thereby improving production efficiency.

BRIEF DESCRIPTION OF THE DRAWINGS

The above and other features and advantages will become more apparent to those of ordinary skill in the art by describing in detail exemplary embodiments with reference to the attached drawings, in which.

In the following description, the same or similar elements are labeled with the same or similar reference numbers.

DETAILED DESCRIPTION

Figure 1:
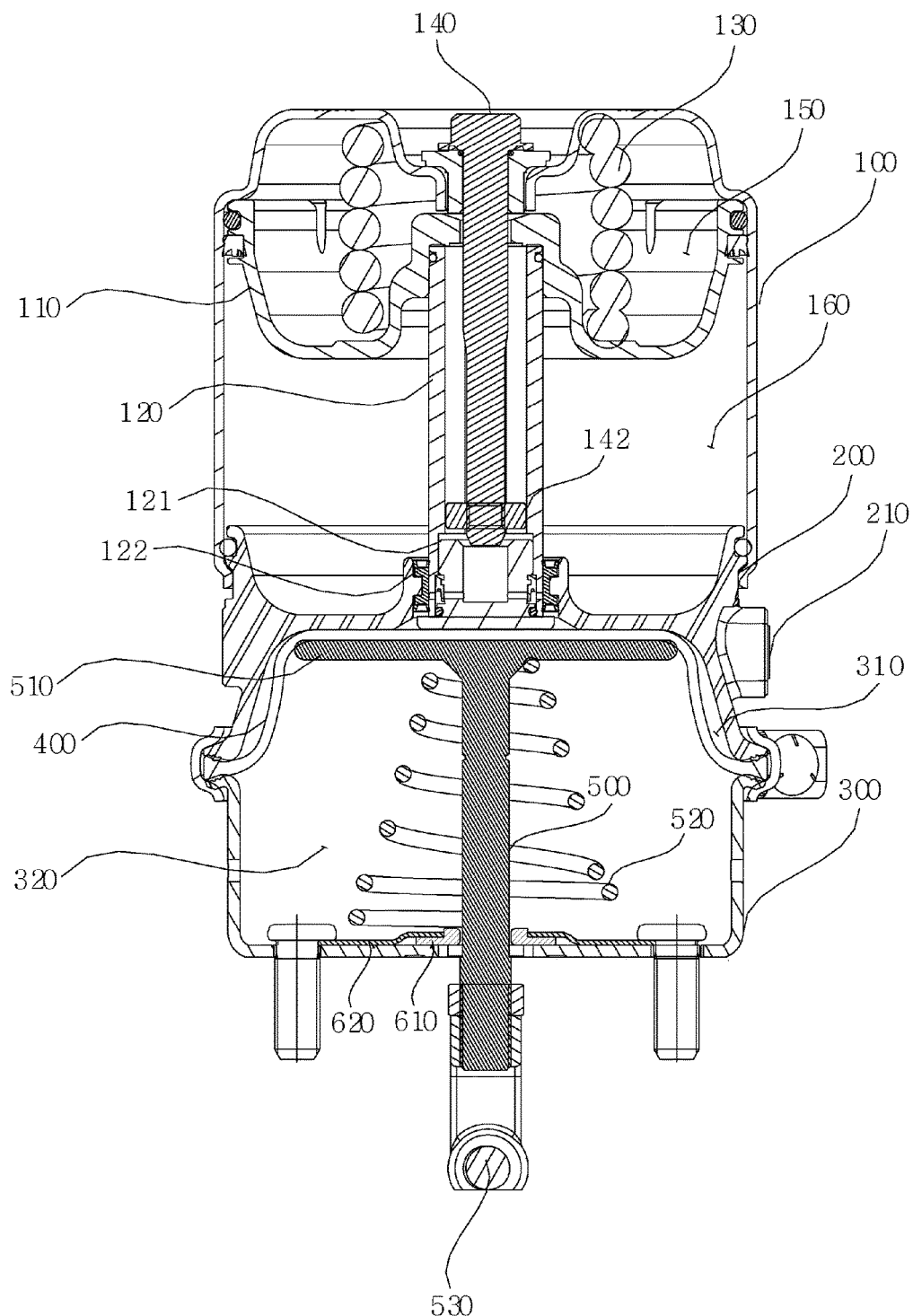
FIG. 1 is a diagram showing configuration of a pneumatic spring brake chamber for a vehicle.

The present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes", "comprises" and/or "comprising," when used in this specification, specify the presence of stated features, integers, steps, operations, elements, and/or components, but do not preclude the presence or addition of one or more other features, integers, steps, operations, elements, components, and/or groups thereof. In addition, a term such as a "unit", a "module", a "block" or like, when used in the specification, represents a unit that processes at least one function or operation, and the unit or the like may be implemented by hardware or software or a combination of hardware and software.

Reference herein to a layer formed "on" a substrate or other layer refers to a layer formed directly on top of the substrate or other layer or to an intermediate layer or intermediate layers formed on the substrate or other layer. It will also be understood by those skilled in the art that structures or shapes that are "adjacent" to other structures or shapes may have portions that overlap or are disposed below the adjacent features.

In this specification, the relative terms, such as "below", "above", "upper", "lower", "horizontal", and "vertical", may be used to describe the relationship of one component, layer, or region to another component, layer, or region, as shown in the accompanying drawings. It is to be understood that these terms are intended to encompass not only the directions indicated in the figures, but also the other directions of the elements.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Preferred embodiments will now be described more fully hereinafter with reference to the accompanying drawings. However, they may be embodied in different forms and should not be construed as limited to the embodiments set forth herein. Rather, these embodiments are provided so that this disclosure will be thorough and complete, and will fully convey the scope of the disclosure to those skilled in the art.

FIG. 1 is a diagram showing configuration of a pneumatic spring brake chamber for a vehicle.

First, the brake chamber for a vehicle is described with reference to FIG. 1. The pneumatic spring brake chamber for a vehicle has a flow of air between a spring chamber 150 and a service chamber 310 through a hollow actuator rod 120 placed between the spring chamber 150 and the service chamber 310 and an actuator rod valve 121 connected to the lower end of the actuator rod 120.

The pneumatic spring brake chamber for a vehicle includes a head housing 100, an adaptor housing 200 and a bottom housing 300 of a hollow shape in a sequential order from the top, and a piston 110 is placed between the head housing 100 and the adaptor housing 200, and a diaphragm 400 is placed between the adaptor housing 200 and the bottom housing 300.

On the other hand, the actuator rod 120 has a through-hole running through the adaptor housing 200 in the downward direction of a piston through-hole formed in the piston 110, and a rod valve 121 is placed at the end of the actuator rod 120. The rod valve 121 brings the spring chamber 150 and the service chamber 310 into communication with each other, allowing air to flow. Although this embodiment shows that the piston 110 and the actuator rod 120 are formed separately from each other, the piston 110 and the actuator rod 120 may be integrally formed.

The pneumatic spring brake chamber for a vehicle has the spring chamber 150 between the head housing 100 and the piston 110, and a pressure chamber 160 between the piston 110 and the adaptor housing 200. Furthermore, the pneumatic spring brake chamber for a vehicle has the service chamber 310 between the adaptor housing 200 and the diaphragm 400, and a push rod chamber 320 between the diaphragm 400 and the bottom housing 300.

A compressive sprig 130 placed in the spring chamber 150 is a coil spring, and the outer diameter of the coil may become smaller as it goes from the center of the coil toward two side ends. In this instance, the compressive spring 130 is contacted with and supported on the piston 110 at one end, and is contacted with and supported on a curve of the head housing 100 at the other end.

On the other hand, the head housing 100 has a curve along the inner side of the head housing 100 at the upper end part, and the curve prevents the compressive spring 130 from moving its position at the upper part, so that the compressive spring 130 is compressed, always maintaining a constant center axis.

The piston 110 is tightly fitted to the inner part of the head housing 100, and divides an inner space of the head housing 100 into the spring chamber 150 and the pressure chamber 160. The hollow actuator rod 120 is placed in one direction along the piston through-hole. Accordingly, the actuator rod 120 may be, at one end, connected to and supported on the piston 110, and at the other end, may be supported on the diaphragm 400 through the through-hole of the adaptor housing 200.

A lip seal 122 is placed at a region where the outer circumferential surface of the actuator rod 120 and the inner circumferential surface of the adaptor housing 200 come into contact with each other, to prevent a fluid from leaking out.

Within the hollow actuator rod 120, a caging bolt 140 is placed along the hollow of the adaptor housing 200 with one end fixed to a head housing through-hole of the head housing 100, and a caging nut 142 is placed with the other end screw-connected to the caging bolt 140.

The adaptor housing 200 is placed between the head housing 100 and the bottom housing 300 to interconnect the head housing 100 and the bottom housing 300. The adaptor housing 200 has a through-hole at the center, and the actuator rod 120 is contacted with and supported on the diaphragm 400 through the through-hole. The adaptor housing 200 has a valve structure 210 on one side surface to allow air to flow in, so that air can flow in when the parking brake operates at the driving stage of the vehicle.

On the other hand, the diaphragm 400 is placed in the bottom housing 300, and is contacted with and supported on a push rod plate 510 and divides the bottom housing 300 into the service chamber 310 and a push rod chamber 320. In this instance, the push rod plate 510 is supported on a push rod 500, and plays a role in transmitting a movement of the diaphragm 400 induced by the air pressure to the push rod 500. A push rod spring 520 is placed between the push rod plate 510 and the bottom housing 300 along the axial direction of the push rod 500, and is compressed and restored with the movement of the push rod plate 510.

As described above, the diaphragm 400 moves up and down the push rod plate 510 and the push rod by adjustment of the elastic force of the compressive spring 130 in the spring chamber 150 and the air pressure in the pressure chamber 160, so that operation of the brake (not shown) connected to the lower end of the push rod 500 can be controlled.

In this instance, a push rod guide 610 to guide the movement of the push rod 500 moving along a push rod through-hole 330 and a push rod guide cover 620 to fix the push rod guide 610 are provided on the lower surface of the bottom housing 300, and the shape of the bottom housing 300 and the shape of the push rod and the yoke may be variously formed and the shape is not limited in the present disclosure, and hereinafter the push rod guide 610 and the push rod guide cover 620 are described in detail.

Figure 2:
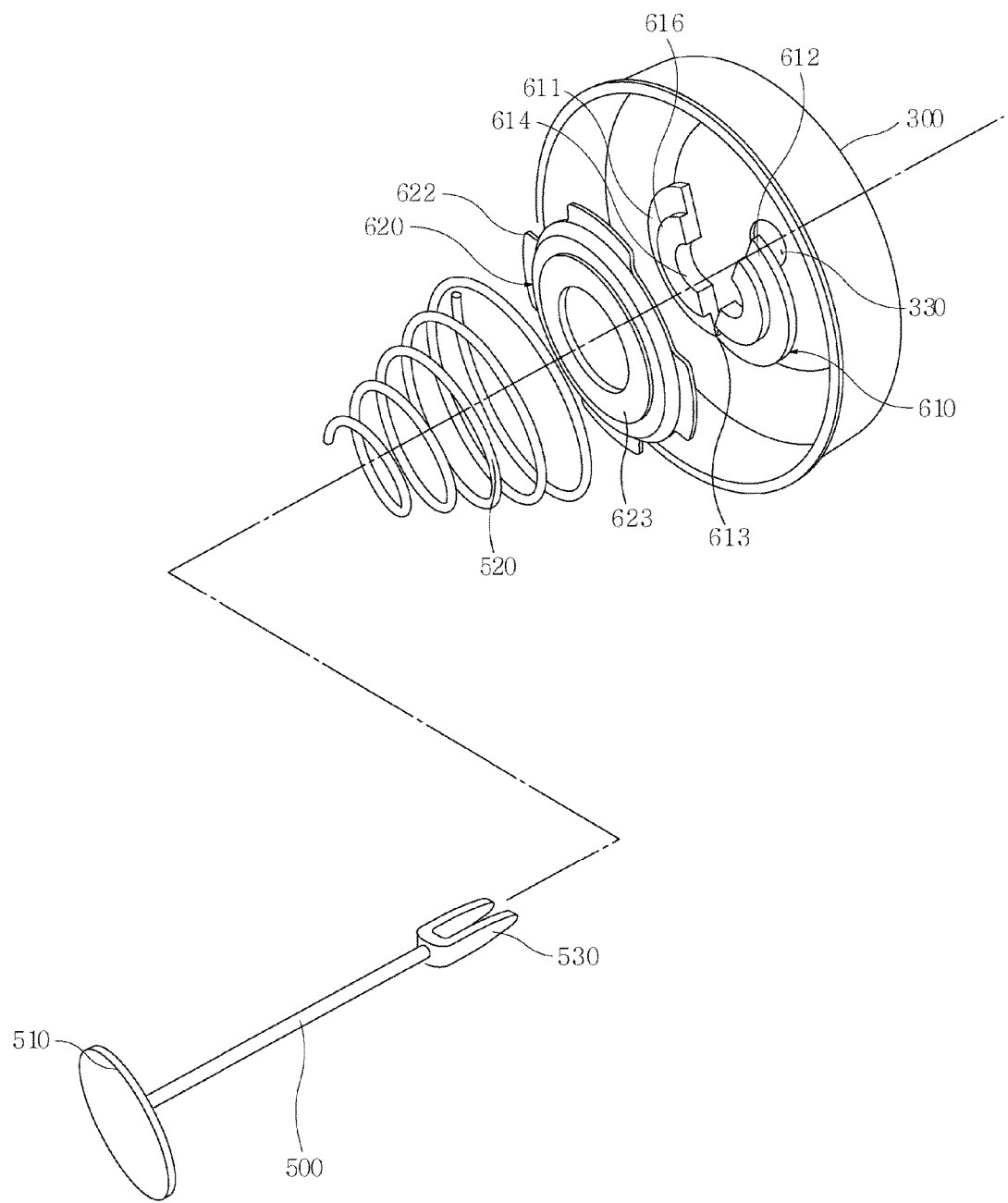
FIG. 2 is an exploded perspective view showing connection of a push rod guide and a push rod guide cover in a bottom housing according to an embodiment of the present disclosure.
Figure 3:
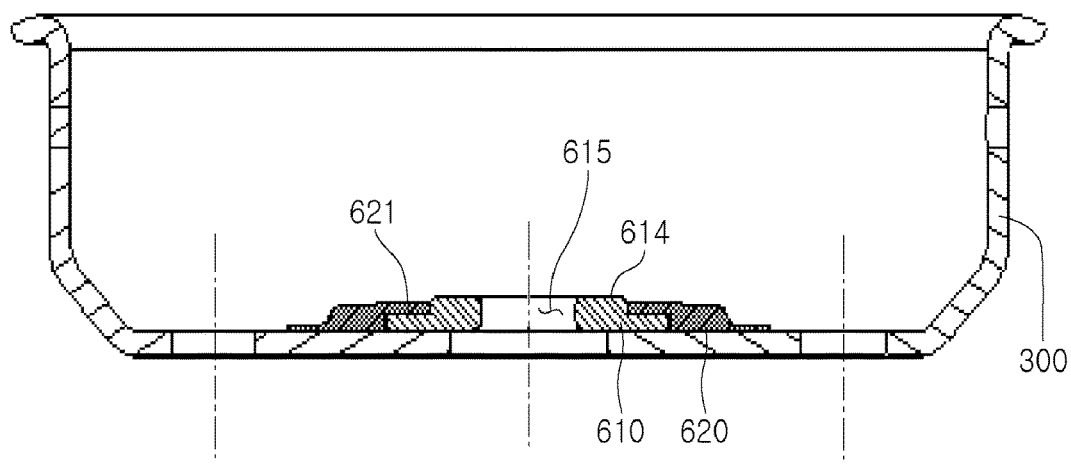
FIG. 3 is a cross-sectional view showing a push rod guide and a push rod guide cover according to an embodiment of the present disclosure, when connected to each other in a bottom housing.
Figure 4:
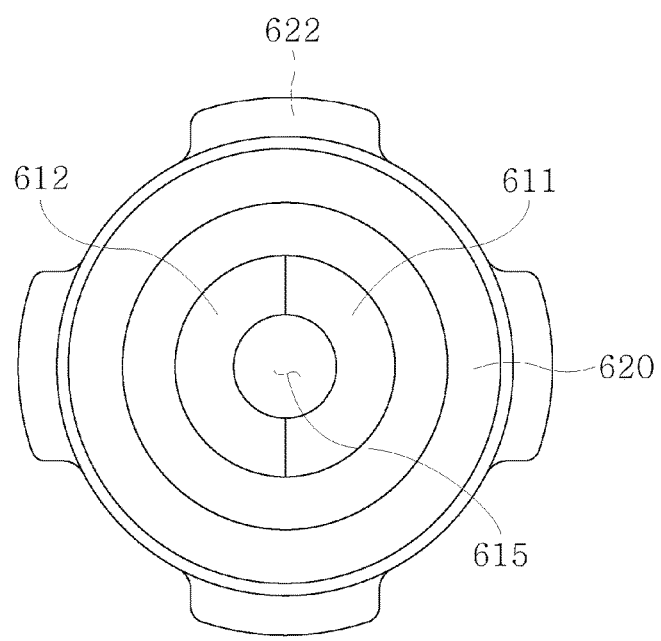
FIG. 4 is a plane view showing a push rod guide and a push rod guide cover according to an embodiment of the present disclosure, when connected to each other.

FIG. 2 is an exploded perspective view showing connection of the push rod guide and the push rod guide cover in the bottom housing according to an embodiment of the present disclosure, FIG. 3 is a cross-sectional view showing the push rod guide and the push rod guide cover according to an embodiment of the present disclosure when connected to each other in the bottom housing, and FIG. 4 is a plane view showing the push rod guide and the push rod guide cover according to an embodiment of the present disclosure when connected to each other.

The push rod guide and the push rod guide cover according to an embodiment of the present disclosure are described in more detail with reference to FIGS. 2 to 4.

The push rod 500 has a yoke 530 at the end, and is inserted into the push rod through-hole 330. Because the yoke 530 has a larger diameter than the push rod 500, when the push rod 500 is inserted into the push rod through-hole 330, a gap is formed between the outer circumferential surface of the push rod 500 and the push rod through-hole 330. The push rod guide 610 hermetically seals the gap, and guides the movement of the push rod 500. Furthermore, when the push rod 500 is inserted into the push rod through-hole 330, the return spring 520 and the push rod guide cover 620 are inserted and placed into the inner space of the bottom housing 300 along the axial direction of the push rod 500 together.

The push rod guide 610 is composed of a pair of semi-circular half members 611, 612 in the shape of a plate, and the half members 611, 612 are hingedly connected to each other and integrally formed. The pair of half members 611, 612 can pivot around a hinge shaft 613. In this instance, each of the half members 611, 612 has a semi-circle cut out 614, and the semi-circle cut outs 614 form a guide hole 615 when connected adjacent to each other, facing towards each other.

As described above, when the pair of half members 611, 612 are spread apart and the push rod 500 is inserted into the pair of half members 611, 612 along the push rod through-hole 330, the pair of half members 611, 612 are connected at the side surface of the push rod 500 and pivot each other into engagement so that the semi-circle cut outs 614 form the guide hole 615 of a closed shape. The guide hole 615 plays a role in guiding the movement of the push rod 500 on the lower surface of the bottom housing 300.

On the other hand, the push rod guide 610 has a protrusion 616 projecting upwards at the central part, forming a step in the radial direction of the push rod guide 610. The protrusion 616 is connected to a receiving groove 621 formed in the push rod guide cover 620 as described below.

The push rod guide cover 620 plays a role in fixing the push rod guide 610 to the lower surface of the bottom housing 300. The inner diameter of the push rod guide cover 620 is large enough to receive the outer circumference of the push rod guide 610. In this instance, the outer circumferential surface of the push rod guide cover 620 may be fixed by the return spring 520 placed between the push rod plate 510 and the bottom housing 300. Thereby, a predetermined pressure acts on the outer circumferential surface of the push rod guide cover 620 by the return spring 520, thereby preventing the push rod guide 610 and the push rod guide cover 620 from moving.

The push rod guide cover 620 has the receiving groove 621 corresponding to the step of the push rod guide 610 on the inner circumferential surface. The protrusion 616 formed in the push rod guide 610 is inserted fixedly into the receiving groove 621. Accordingly, the push rod guide 610 is firmly fixed to the lower surface of the bottom housing 300 without a separate connecting member such as a bolt. The push rod guide 610 and the push rod guide cover 620 may be preferably formed of a synthetic resin material having elastic properties, and the pair of half members 611, 612 may be integrally formed by injection molding.

On the other hand, the push rod guide cover 620 may further include fixing wings 622 extending juttingly in the radial direction at the interval of at least 90 degrees on the outer circumferential surface. The fixing wings 622 can play a role in fixing the push rod guide 610 to the lower surface of the bottom housing 300 more stably by the return spring 520.

In this instance, the push rod guide cover 620 may have a spring fixing step 623 on the outer circumferential surface. The spring fixing step 623 is formed in the radial direction to prevent the return spring 520 from moving in the horizontal direction.

As described above, the push rod guide 610 is composed of the pair of half members 611, 612 integrally formed by injection molding, and the pair of half members 611, 612 pivot around the hinge shaft 613, and thereby achieving engagement at the side surface of the push rod 500 in a simple manner. Furthermore, the push rod guide 610 is inserted fixedly into the receiving groove 621 formed in the push rod guide cover 620, thereby maintaining firm and strong engagement without a separate connecting member.

A conventional push rod guide was formed with separate members, and used a connecting member such as a bolt to engage each separate member. This made it difficult to maintain firm and strong engagement in a bottom housing having a narrow available space, and needed an additional fabrication process, resulting in the prolonged process time. Furthermore, the connecting member may be separated due to vibration generated when the brake operates, and the present disclosure can solve the conventional problems through the aforementioned structural features.

While the present disclosure has been described with reference to the embodiments illustrated in the figures, the embodiments are merely examples, and it will be understood by those skilled in the art that various changes in form and other embodiments equivalent thereto can be performed. Therefore, the technical scope of the disclosure is defined by the technical idea of the appended claims The drawings and the forgoing description gave examples of the present invention. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An engagement structure of a push rod guide and a push rod guide cover of a brake chamber for a vehicle, in which a brake chamber for a vehicle comprises a head housing, a bottom housing, an adaptor housing provided between the head housing and the bottom housing to connect the head housing to the bottom housing, and a diaphragm fixed between the adaptor housing and the bottom housing to divide a space between the adaptor housing and the bottom housing; a push rod which supports a lower surface of the diaphragm and moves along a push rod through-hole formed on a lower surface of the bottom housing; a yoke connected to an end of the push rod; and a return spring placed between the push rod and the bottom housing, wherein after the push rod and the yoke are inserted into the push rod through-hole, the push rod guide is assembled at a side surface of an axial direction of the push rod on an inner side of the bottom housing, and the push rod guide cover is connected to the push rod guide and is supported on the return spring to fix the push rod guide, wherein the push rod guide comprises:
    a pair of semi-circular half members in a shape of a plate, the pair of half members hingedly connected are assembled at the side surface of the axial direction of the push rod into a shape of a disk; and
    a push rod opening is formed at a center of the disk to guide the movement of the push rod, wherein a protrusion projecting upwards is provided at a central part of the push rod guide, forming a step in a radial direction of the push rod guide, and a receiving groove corresponding to the step is formed on an inner circumferential surface of the push rod guide cover.

2. The engagement structure of a push rod guide and a push rod guide cover of a brake chamber for a vehicle of claim 1, wherein the push rod guide is formed of a plastic material, and the pair of half members are, at one end, integrally formed by injection molding to form a hinge.

3. A brake chamber for a vehicle comprising:
    a head housing;
    a bottom housing;
    an adaptor housing provided between the head housing and the bottom housing to connect the head housing to the bottom housing;
    a diaphragm fixed between the adaptor housing and the bottom housing to divide a space between the adaptor housing and the bottom housing;
    a push rod supporting a lower surface of the diaphragm and moving along a push rod through-hole formed on a lower surface of the bottom housing;
    a yoke connected to an end of the push rod;
    a return spring placed between the push rod and the bottom housing;
    a push rod guide assembled at a side surface of an axial direction of the push rod on an inner side of the bottom housing; and
    a push rod guide cover connected to the push rod guide and supported on the return spring to fix the push rod guide,
    wherein the push rod guide comprises:
        a pair of semi-circular half members in a shape of a plate, the pair of half members hingedly connected are assembled at the side surface of the axial direction of the push rod into a shape of a disk; and
        a push rod opening is formed at a center of the disk to guide the movement of the push rod.

4. The brake chamber for a vehicle of claim 3, further comprising a protrusion projecting upwards provided at a central part of the push rod guide.

5. The brake chamber for a vehicle of claim 3, wherein after the push rod and the yoke are inserted into the push rod through-hole, the push rod guide is assembled at a side surface of the axial direction of the push rod on an inner side of the bottom housing, and the push rod guide cover is connected to the push rod guide and is supported on the return spring to fix the push rod guide.

* * * * *